United States Patent Office 3,052,708
Patented Sept. 4, 1962

3,052,708
PROCESS FOR THE PREPARATION OF AROMATIC SULFONES
Leon Velluz, Paris, Robert Joly, Montmorency, Robert Bucourt, Villiers-le-Bel, and Colette Fabignon, Paris, France, assignors to Roussel-UCLAF, Societe Anonyme, Paris, France, a corporation of France
No Drawing. Filed Apr. 16, 1959, Ser. No. 806,750
Claims priority, application France July 5, 1958
12 Claims. (Cl. 260—456)

This invention relates to a process for the preparation of aromatic sulfones having the structural formula $$R-SO_2-R' \qquad (I)$$

wherein R and R' represent aryl groups which may be identical or different from each other and which may have substituents attached thereto, the process comprising reacting an aromatic compound of the formula $$R'-H \qquad (II)$$

where R' has the meaning given above and H represents at least one replaceable hydrogen atom, with either a mixed anhydride of an aromatic sulfonic acid and a lower alkyl bisulfate of the formula $$R-SO_2-O-SO_2-O-R'' \qquad (III)$$

wherein R has the same meaning as defined above and R'' represents a lower alkyl radical, especially the methyl radical, or with a lower alkyl halopyrosulfate of the formula $$X-SO_2-O-SO_2-O-R'' \qquad (IV)$$

wherein X represents a halogen radical, especially the chloride, and R'' has the same meaning as defined above. The lower alkyl halopyrosulfates (IV) and the mixed anhydrides (III) are themselves novel and the invention relates also to them and their production.

The commercial process of obtaining aromatic sulfones heretofore used was by the condensation of an aromatic sulfochloride with an aromatic compound having a replaceable hydrogen atom in the presence of aluminum chloride. This process requires corrosion-resistant apparatus and the difficult preliminary preparation and isolation of the aromatic sulfochloride. Direct conversions of aromatic compounds having a replaceable hydrogen atom to aromatic sulfones by means of chlorosulfonic acid or sulfuric anhydride are also known, but the yields are low and only symmetrically substituted aromatic sulfones are produced.

It is an object of this invention to produce aromatic sulfones in good yield by an improved process.

A further object of this invention is the obtention of lower alkyl halopyrosulfates and mixed anhydrides of aromatic sulfonic acids and lower alkyl bisulfates useful as intermediates in the production of aromatic sulfones.

A still further object of this invention is a process for the production of lower alkyl halopyrosulfates and mixed anhydrides of aromatic sulfonic acids and lower alkyl bisulfates.

These and other objects of our invention will become more apparent as the description proceeds.

We have found that the production of aromatic sulfones having the structural formula $$R-SO_2-R' \qquad (I)$$

wherein R and R' represent aromatic radicals which may be identical or different from each other and which may have substituents attached thereto, can be obtained in good yield by reacting an aromatic compound of the formula R'—H (II), where R' has the meaning given above and H represents at least one replaceable hydrogen atom, with a sulfate selected from the group consisting of (1) a mixed anhydride of an aromatic sulfonic acid and a lower alkyl acid sulfate of the formula $$R-SO_2-O-SO_2-O-R'' \qquad (III)$$

wherein R has the meaning given above and R'' represents a lower alkyl radical, especially the methyl radical, and (2) a lower alkyl halopyrosulfate of the formula $$X-SO_2-O-SO_2-O-R'' \qquad (IV)$$

wherein X represents a halogen radical, especially the chloride, and R'' has the meaning given above. The reaction proceeds in accordance with either of Equations A or B as follows:

Equation A $$R-SO_2-O-SO_2-O-R'' + R'H \longrightarrow R-SO_2-R' + SO_2\underset{OH}{\overset{OR''}{<}}$$

$$\text{III} \qquad \text{II} \qquad \text{I}$$

Equation B $$2X-SO_2-O-SO_2-O-R'' + 2R'H \longrightarrow$$
$$\text{IV} \qquad \text{II}$$

$$R'-SO_2-R' + XSO_2-OH + XSO_2-OR'' + SO_2\underset{OH}{\overset{OR''}{<}}$$
$$\text{I}$$

The reaction neither requires a catalyst or a solvent. It often begins at room temperature and is generally completed at temperatures of less than 100° C., although temperatures of 100° C. or over can be used. The reaction according to Equation B commences at even lower temperatures. The reactions are exothermic and care should be exercised to avoid an undue rise in temperature. In order to directly isolate the sulfone the reaction mixture is poured into water whereupon the sulfone separates out. The novel process therefore lends itself readily to performance on an industrial scale and does not require either special apparatus or special precautions.

The di-lower alkyl pyrosulfates, $$R''-O-SO_2-O-SO_2-O-R''$$

when reacted with an aromatic compound of Formula II under conditions comparable to Equation B produces only a small yield of sulfone.

It is to be noted that the process according to Equation A results in the production of either unsymmetrical or symmetrical aromatic sulfones, whereas by the process according to Equation B, only symmetrical aromatic sulfones are produced.

As aromatic compounds of the formula R'—H (II), where R' represents an aromatic radical and H represents at least one replaceable hydrogen atom, used as starting materials in the practice of the invention, we prefer those carbocyclic aromatic compounds having a benzene nucleus. Such compounds are benzene and monocyclic benzenes substituted with alkyl radicals, halogen radicals, alkoxy radicals, etc. Radicals of these same benzene compounds are likewise preferred for the R radical in the mixed anhydride (III) starting material.

The mixed anhydrides (III) used as starting materials according to Equation A may be obtained by one of the following methods:

(a) By reaction of a lower alkyl pyrosulfate of the formula $$R''-O-SO_2-O-SO_2-O-R''$$

with a sulfonic acid of the formula R—SO₃H where R and R'' have the meanings given above; or (b) By reaction of sulfuric anhydride with an ester of a sulfonic acid of the formula $$R—SO_2—O—R''$$

where R and R'' have the meanings given above.

Both of these reactions occur at temperatures up to 100° C.

As a variation of process (a), it is possible to react a solution of 1 mol of sulfuric anhydride in a lower alkyl pyrosulfate with an aromatic compound of the formula R'—H, whereby the sulfonic acid is formed in situ so that it is possible to start directly from an aromatic compound. Of course, in this case the sulfone is symmetrical (R=R'). The lower alkyl pyrosulfates used in this reaction are conveniently prepared by reaction of sulfuric anhydride with a dialkyl sulfate or the corresponding dialkyl oxide, such as dimethyl sulfate or diethyl sulfate, dimethyl oxide or diethyl oxide.

The lower alkyl halopyrosulfates (IV) used as starting materials according to Equation B may be obtained by reacting a lower alkyl halide with sulfuric anhydride in accordance with the following equation:

$$R''—X+2SO_3 \longrightarrow X—SO_2—O—SO_2—O—R''$$
$$\text{IV}$$

where X represents a halogen radical.

The lower alkyl halopyrosulfates are novel compounds and heretofore it was believed that the reaction of a lower alkyl halide with sulfuric anhydride would lead only to an alkyl halosulfonate.

The process of Equation B makes it possible to prepare certain sulfones which cannot be obtained in accordance with the process of Equation A. Thus, dimethoxy-diphenylsulfone, which cannot be obtained in accordance with the process of Equation A using the mixed anhydride (III), may be readily obtained by reacting anisole with lower alkyl halopyrosulfates.

All of the operations involving the use of sulfuric anhydride are conveniently carried out by employing the same in the form of its liquid, stabilized commercial trimer, which is known under the tradename of "Sulfan."

The following examples illustrate the invention without limiting the same. More particularly, as is well known to one skilled in the art, the temperatures may be varied, other aromatic compounds than those mentioned may be used, or the order of introducing the reagents may be changed without departing from the spirit of the invention. The temperatures are given in degrees centigrade.

EXAMPLE I

*Preparation of 4-Methyl Diphenylsulfone*

(Formula I, $R=C_6H_4—CH_3$; $R'=C_6H_5$)

(a) *Starting with p-toluene-sulfonic acid.*—50 gm. (about 0.27 mol) of p-toluene-sulfonic acid with 1 mol of water of crystallization is dehydrated by heating it in a vacuum at 150° C. 24 cc. (about 0.27 mol) of anhydrous benzene are added at 60° to 70° C. to the molten anhydrous acid, and the solution is cooled to room temperture. 54 gm. (about 0.27 mol) of dimethyl pyrosulfate, prepared by introducing 1 mol of sulfuric anhydride into 1 mol of dimethyl sulfate or reacting 2 mols of sulfuric anhydride with 1 mol of dimethyl ether, are added to the above anhydrous supersaturated p-toluene-sulfonic acid solution in benzene over a period of about 10 minutes while mechanically agitating the mixture. When all of the pyrosulfate has been added, the mixture is heated to a temperature of 70 to 72° C. over a period of about 10 minutes. An exothermic reaction occurs which causes the temperature of the reaction mixture to rise to 91 to 92° C. The anhydrous p-toluene-sulfonic acid reacts with the dimethyl pyrosulfate to form the mixed anhydride (III)

(R=—$C_6H_4$—$CH_3$; R''=—$CH_3$)

or the mixed anhydride of toluene sulfonic acid and methyl acid sulfate having the formula

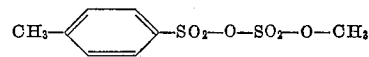

Simultaneously with the formation of the mixed anhydride, it reacts with the benzene present, according to Equation A, to form 4-methyl diphenylsulfone. The mixture is then allowed to cool and is poured into 150 cc. of water. The 4-methyl diphenylsulfone crystallizes out. The precipitate is filtered off, washed with water and then dried. The yield is 43.5 gm. (71% of theory). After recrystallization from methanol, the melting point of the product is 126° C. The compound is identical with that described by Simons et al., J. Am. Chem. Soc., 63, 608 (1941).

(b) *Starting with methyl p-toluene-sulfonate.*—8.6 gm. (about 0.107 mol) of sulfuric anhydride, in the form of commercial "Sulfan," are added over a period of 5 minutes to 20 gm. (about 0.107 mol) of molten methyl p-toluene-sulfonate while mechanically agitating the mixture and cooling it so that the temperature does not rise above 35° C. The reaction mixture is allowed to stand for two hours at 30° to 35° C. To the mixed anhydride formed thereby (III, $R=C_6H_4—CH_3$; $R''=CH_3$)

are added 10 cc. (about 0.11 mol) of anhydrous benzene. The reaction begins immediately and the temperature rises to 90° C. After allowing the reaction mixture to stand overnight at room temperature, it is poured into 100 cc. water. The 4-methyl diphenylsulfone crystallizes out and is purified in the manner described under (a) above. 20.2 gm. of sulfone are obtained, which corresponds to a yield of 81% of the desired sulfone. After recrystallization from ethanol, the product, 4-methyl diphenyl-sulfone, does not show any depression of the melting point in admixture with the product prepared in accordance with (a) above.

EXAMPLE II

*Preparation of 4-Chloro-4'-Methyl-Diphenylsulfone*

(Formula I, $R=C_6H_4—CH_3$; $R'=C_6H_4—Cl$)

17.3 gm. (about 0.216 mol) of "Sulfan" are introduced over a period of 15 minutes into 40.2 gm. of methyl p-toluene-sulfonate heated to 30° C., forming the mixed anhydride (Formula III, $R=C_6H_4—CH_3$; $R''=CH_3$). The mixture is mechanically agitated and cooled so that the temperature does not rise above 35° C. during the addition. The mixture is then allowed to cool to room temperature. 22 cc. (about 0.216 mol) of chlorobenzene are then added to the mixture over a period of a few minutes while cooling so that the temperature is maintained at 40° C. The reaction mixture is then heated for three hours at 50° to 55° C., after which the reaction mixture is poured into 150 cc. of a mixture of ice and water. 4-chloro-4'-methyl-diphenylsulfone crystallizes out. After separating the crystalline precipitate, washing it with water and drying it, 41.5 gm. of 4-chloro-4'-methyl-diphenylsulfone are obtained, which represents a yield 72%. After recrystallization from ethanol the product melts at 124° C. and is in all respects identical to the compound described by Burton et al., J. Chem. Soc. (London), 1948, 601.

EXAMPLE III

*Preparation of 4-Chloro-Diphenylsulfone*

(Formula I, $R=C_6H_5$; $R'=C_6H_4—Cl$)

(a) *Starting with benzene-sulfonic acid.*—Anhydrous benzene-sulfonic acid is obtained by dehydration of crystallized benzene-sulfonic acid. 58 gm. (about 0.28 mol) of dimethyl pyrosulfate are added to 43.9 gm. (about 0.28 mol) of this freshly prepared anhydrous benzene-sulfonic acid after it is cooled to 50° C. No evolution of heat whatsoever can be noted. The reaction mixture is then maintained for 35 minutes at 40° C. by heating it. Thereafter, the mixed anhydride reaction mixture is allowed to cool to room temperature and 28 cc. (about 0.28 mol) of chloro-benzene are added thereto over a period of about 15 minutes while cooling in order to maintain the temperature at 20° to 25° C. When the reaction is no longer exothermic, the mixture is heated to 40° C. The exothermic reaction recommences and the temperature of the reaction mixture rises to 55° C. It is maintained at this temperature for about 30 minutes, allowed to stand overnight at room temperature and is then poured into 150 cc. of a water-ice mixture. The sulfone crystallizes out. It is separated, washed with water, dried and recrystallized from ethanol. Pure 4-chloro-diphenylsulfone having a melting point of 94.5° C. is obtained, which is identical in all respects to the product described by Bergmann et al., Ber. Dtsch. Chem. Ges., 65, 457 (1932).

(b) *Starting with methyl benzene-sulfonate.*—9.4 gm. (about 0.117 mol) of sulfuric anhydride are fairly rapidly added to 20.2 gm. (about 0.117 mol) of methyl benzene-sulfonate, accompanied by agitation. The temperature of the reaction mixture rises to 77° C. After the temperature has diminished on its own to 20° to 25° C. To the mixed anhydride of benzene sulfonic acid and methyl acid sulfate having the formula

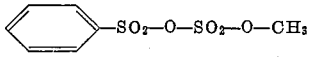

12 cc. (about 0.117 mol) of anhydrous chlorobenzene are added, accompanied by agitation and cooling so that the temperature does not rise above 45° C. The mixture is then heated to 50° C. for 1.5 hours. It is then cooled to 20° C. and poured into 100 cc. of a water-ice mixture. After drying, 24.2 gm. of 4-chloro-diphenylsulfone are obtained which represents a yield of 82%. The product is practically pure and is identical to the compound prepared in (a) above.

EXAMPLE IV

*Preparation of 4,4'-Dimethyl-Diphenylsulfone*

(Formula I, R and R'=—$C_6H_4$—$CH_3$)

A solution of about 1 mol of sulfuric anhydride in about 1 mol of dimethyl pyrosulfate is prepared by slowly adding 160 gm. of "Sulfan" to 139 gm. of dimethyl sulfate in the absence of any trace of moisture. The addition is accompanied by agitation and the reaction mixture is allowed to return to room temperature after its temperature goes to 78° C. This solution is added over a period of 25 minutes to 184 gm. of anhydrous toluene (2 mols) at a temperature of from 20° to 25° C. while stirring and maintaining the temperature constant by cooling. After all of the solution has been added, the mixture is stirred for 20 minutes at 25° to 30° C. and is then heated to a temperature of 75° to 80° C. An exothermic reaction is released thereby and the temperature of the reaction mixture reaches 120° C. after a few minutes. It is then allowed to cool to room temperature and is poured into 600 cc. of water. The sulfone crystallizes out. It is separated, washed with water, dried and recrystallized from ethanol. Pure 4,4'-dimethyl-diphenylsulfone having a melting point of 163.5° C. is obtained which is identical in all respects to the compound described by Rheinboldt et al., J. Am. Chem. Soc., 68, 973 (1946).

EXAMPLE V

*Preparation of Diphenylsulfone*

(Formula I, R and R'=—$C_6H_5$)

By starting with 156 gm. (2 mols) of anhydrous benzene and adding a solution of about 1 mol of sulfuric anhydride in about 1 mol of dimethyl pyrosulfate, the latter solution having been prepared from 139 gm. of dimethyl sulfate and 160 gm. of "Sulfan" in accordance with the method described in the preceding example, raising the temperature gradually to 70° to 75° C., maintaining it at that level for 1 hour, and treating the product in the manner previously described, 182 gm. of practically pure diphenyl-sulfone are obtained, which represents a yield of 83%. Recrystallized from ethanol, the product has a melting point of 127° C., and does not differ in any way from the product prepared by Mikeska et al., J. Am. Chem. Soc., 58, 1869 (1936).

EXAMPLE VI

*Preparation of 3,4,3',4'-Tetrachloro-Diphenylsulfone*

(Formula I, R and R'=—$C_6H_3Cl_2$)

A solution of sulfuric anhydride (about 1 mol) in dimethyl pyrosulfate (about 1 mol), prepared in accordance with the method indicated in Example IV from 139 gm. of dimethyl sulfate and 160 gm. of "Sulfan," is added over a period of 35 minutes to 294 gm. (about 2 mols) of technical grade o-dichlorobenzene, accompanied by stirring and cooling to maintain the temperature at 20 to 25° C. The mixture is then stirred without cooling, whereby the temperature rises on its own to 50° to 55° C., and the sulfone begins to crystallize out. The reaction mixture is then heated for another hour at 50° to 55° C. and then it is poured into water. The precipitated sulfone is separated, washed with isopropyl ether, then with water and dried. The product having a melting point of 176.5° C. is in all respects identical to the compound described by Huntress et al., J. Am. Chem. Soc., 62, 511 (1940).

EXAMPLE VII

*Preparation of 4,4'-Dichloro-Diphenylsulfone*

(Formula I, R and R'=—$C_6H_4$—Cl)

80 gm. (about 1 mol) of "Sulfan" are added over a period of 25 minutes to 154 gm. of diethyl sulfate (1 mol) while stirring the mixture and cooling it so that the temperature is maintained between 0° and +5° C. The temperature is maintained between 0° and +10° C. for 3 hours while continuing the agitation. Thereafter, 225 gm. of chlorobenzene (2 mols) are added over a period of 25 minutes without allowing the temperature of the reaction mixture to rise above +10° C., and then 80 gm. of "Sulfan" (1 mol) are added. The reaction is very exothermic. Agitation is continued for 30 minutes while maintaining the same temperature, and then the reaction mixture is allowed to heat up to room temperature. The temperature rises to 34° C. and the desired sulfone crystallizes out. The reaction mixture is allowed to stand overnight and is then poured into 600 cc. water. The precipitate is separated, washed with hot water, and dried. 144 gm. of 4,4'-dichloro-diphenylsulfone having a melting point of 148° to 150° C. are obtained. The product is identical to that described in the literature.

EXAMPLE VIII

*Preparation of Methyl Chloropyrosulfate by Reaction of Methyl Chloride With Sulfuric Anhydride*

A vigorous stream of methyl chloride is bubbled through 968 gm. of sulfuric anhydride in a round-bottom flask, while agitating the same and maintaining the temperature in the interior of the flask at 18° to 20° C. by cooling with the aid of a water bath, until no more gas is absorbed. By weighing the reaction mixture it is found that 1 mol of methyl chloride has combined with 2 mols of sulfuric anhydride; that is, 305.5 gm. of methyl chloride were combined with the 968 gm. of sulfuric anhydride. If the absorbed quantity of methyl chloride is too great (which is possible if, after the absorption has gone to completion while vigorously bubbling the gas through the anhydride, the stream of gas is then reduced to a very slow bubble-by-bubble rate and the reaction is continued under these conditions), sulfuric anhydride is added to the mixture on the basis of 3.15 gm. per gm. of excess methyl chloride.

The methyl chloropyrosulfate is obtained in the form of a fuming and irritating yellowish liquid. It is insoluble in water at 0° C. and slowly reacts with water.

*Analysis.*—Calculated: S, 30.5%; Cl, 16.87%. Found: S, 32.0%; Cl, 16.3 and 16.05%.

EXAMPLE IX

*Preparation of 4,4'-Dimethyl-Diphenylsulfone*

(Formula I, R=R'= —$C_6H_4$—$CH_3$)

420 gm. (2 mols) of methyl chloropyrosulfate prepared in accordance with Example VIII are added over a period of 25 minutes at 20° to 25° C. to 184 gm. of anhydrous toluene (2 mols) while stirring and maintaining the temperature constant by cooling. After all of the methyl chloropyrosulfate has been added the mixture is stirred for another 20 minutes at 25° to 30° C. and is then heated to a temperature of 75° to 80° C. It is then allowed to cool to room temperature and is poured into 600 cc. water. The solution is heated to the boiling point, cooled and filtered. The filter cake is washed with water and then with methanol, dried and recrystallized from ethanol. 4,4'-dimethyl-diphenylsulfone having a melting point of 163.5° C. is obtained thereby. The product is identical in all respects to the compounds described by Rheinboldt et al., J. Am. Chem. Soc., 68, 973 (1946).

EXAMPLE X

*Preparation of 4,4'-Dichloro-Diphenylsulfone*

(Formula I, R=R'= —$C_6H_4$—Cl)

22.5 gm. (about 0.2 mol) of chlorobenzene are cooled to a temperature of —30° C. and then 42.1 gm. (about 0.2 mol) of methyl chloropyrosulfate, prepared in accordance with Example VIII, are added dropwise to the chlorobenzene, while stirring and maintaining the temperature of the reaction mixture between —30 and —20° C. The temperature of the mixture is allowed to rise to +4° C. and it is then heated within one-half hour to about 75° C. and maintained at that temperature for 15 minutes. The mixture is cooled, the stirring is discontinued, and it is poured into 200 cc. of a mixture of ice and water.

The mixture is then refluxed at the boiling point for 3 hours and is filtered. The filter cake is washed with boiling water and dried. 24.05 gm. of 4,4'-dichloro-diphenylsulfone having a melting point of 150° to 151° C. are obtained, which represents a yield of 84%.

EXAMPLE XI

*Preparation of 4,4'-Dimethoxy-Diphenylsulfone*

(Formula I, R=R'= —$C_6H_4$—O—$CH_3$)

Anisole and methyl chloropyrosulfate are reacted in the manner described in the preceding example, and 4,4'-dimethoxy-diphenylsulfone having a melting point of 133° to 134° C. is isolated. The yield is about 50%.

Attempts to prepare this substance by the process according to Equation A were met by failure.

The above examples disclose various representative embodiments of our invention. Processes according to Equation A are demonstrated by Examples I to VII. Processes according to Equation B are demonstrated by Examples IX to XI. A process of producing the novel lower alkyl halopyrosulfate is demonstrated in Example VIII. Processes of producing the novel mixed anhydride of an aromatic sulfonic acid and a lower alkyl acid sulfate are demonstrated in Examples I to VII. Preparation of the sulfones is demonstrated at temperatures commencing at —30° C. (Example X) and continuing to 120° C. (Example IV). All of the reactions are carried out in the absence of added solvents, excess reactants and catalysts.

While we have described certain specific embodiments of our invention, it will be understood that various modifications and changes may occur to one skilled in the art. Such changes and modifications are within the spirit of our invention and within the scope of the appended claims.

We claim:

1. A process of producing aromatic sulfones having the formula R—$SO_2$—R', wherein R and R' represent carbocyclic aromatic radicals having a benzene nucleus, which comprises contacting about equimolecular amounts of (1) a carbocyclic aromatic compound, R'—H, having a benzene nucleus and containing a replaceable hydrogen atom attached thereto, with (2) a sulfate selected from the group consisting of (1) sulfonate-sulfate mixed anhydrides having the formula R—$SO_2$—O—$SO_2$—O—R", wherein R has the meaning given above and R" represents a lower alkyl radical, and (2) halopyrosulfates having the formula X—$SO_2$—O—$SO_2$—O—R", wherein X represents chlorine and R" represents a lower alkyl radical, at temperatures between about room temperature and 120° C. for a time sufficient to effect the reaction, and recovering said aromatic sulfone from the reaction mass.

2. A process of producing aromatic sulfones having the formula R—$SO_2$—R, wherein each R represents the same carbocyclic aromatic radical having a benzene nucleus, which comprises contacting about equimolecular amounts of (1) a carbocyclic aromatic compound, R—H, having a benzene nucleus and containing a replaceable hydrogen atom attached thereto, with (2) a lower alkyl halopyrosulfate having the formula X—$SO_2$—O—$SO_2$—O—R", wherein X represents chlorine at temperatures between about room temperature and 120° C. and R" represents a lower alkyl radical, for a time sufficient to effect the reaction, adding water to precipitate said aromatic sulfone, and recovering said aromatic sulfone.

3. The process of producing a lower alkyl chloropyrosulfate which comprises reacting about one mol of a lower alkyl chloride with about two mols of liquid sulfuric anhydride at about room temperature under anhydrous conditions, and recovering said lower alkyl chloropyrosulfate.

4. The process of claim 3 wherein one mol of methyl chloride is reacted with two mols of liquid sulfuric anhydride and methyl chloropyrosulfate is recovered.

5. A process of producing aromatic sulfones, having the formula R—$SO_2$—R', wherein R and R' represent radicals selected from the group consisting of phenyl, methylphenyl and chlorophenyl, which comprises contacting about equimolecular amounts of (1) an aromatic compound R'—H, wherein R' has the meaning given above and H represents a replaceable hydrogen atom attached to the benzene nucleus, with (2) a mixed anhydride of an aromatic sulfonic acid and a lower alkyl acid sulfate having the formula R—$SO_2$—O—$SO_2$—O—R", wherein R has the meaning given above and R" represents a lower alkyl radical, at temperatures between about room temperature and 120° C. for a time sufficient to effect the reaction, adding water to precipitate said aromatic sulfone, and recovering said aromatic sulfone.

6. The process of claim 5 wherein said mixed anhydride is prepared by reacting about 1 mol of a lower alkyl ester of said aromatic sulfonic acid with about 1 mol of liquid sulfuric anhydride.

7. The process of claim 5 wherein said mixed anhydride is prepared by reacting about 1 mol of a di-lower alkyl pyrosulfate with about 1 mol of said aromatic sulfonic acid.

8. The process of claim 5 wherein said mixed anhydride is prepared by contacting a solution of about 1 mol of sulfuric anhydride in a di-lower alkyl pyrosulfate with about 2 mols of said aromatic compound, R'—H, forming thereby said corresponding aromatic sulfonic acid in situ, and said aromatic sulfone produced is symmetrical.

9. The process of producing a mixed anhydride of an aromatic sulfonic acid and a lower alkyl acid sulfate having the formula R—$SO_2$—O—$SO_2$—O—R'', wherein R represents a radical selected from the group consisting of phenyl, methylphenyl and chlorophenyl and R'' represents a lower alkyl radical, which comprises contacting about equimolecular amounts of (1) a sulfonate having the formula R—$SO_2$—O—R'', wherein R and R'' have the meanings given above, with (2) liquid sulfuric anhydride under anhydrous conditions at temperatures from about room temperature up to 100° C. for a time sufficient to effect the reaction, and recovering said mixed anhydride.

10. The process of producing a mixed anhydride of an aromatic sulfonic acid and a lower alkyl acid sulfate having the formula R—$SO_2$—O—$SO_2$—O—R'', wherein R represents a radical selected from the group consisting of phenyl, methylphenyl and chlorophenyl and R'' represents a lower alkyl radical, which comprises contacting about equimolecular amounts of (1) a di-lower alkyl pyrosulfate having the formula

R''—O—$SO_2$—O—$SO_2$—O—R'' wherein R'' has the meaning given above, with (2) an aromatic sulfonic acid having the formula R—$SO_3H$, wherein R has the meaning given above, under anhydrous conditions at temperatures from about room temperature up to 100° C. for a time sufficient to effect the reaction, and recovering said mixed anhydride.

11. Methyl chloropyrosulfate having the formula Cl—$SO_2$—O—$SO_2$—O—$CH_3$.

12. Lower alkyl chloropyrosulfates having the formula Cl—$SO_2$—O—$SO_2$—O—R'', wherein R'' represents a lower alkyl.

References Cited in the file of this patent

Meyer: Annalen Der Chemie, 433 (1923), pages 327–336.

Fouque et al.: Bull. Soc. Chim., France (4),33 (1923), pages 180–183.

Heymann et al.: Jour. Amer. Chem. Soc., vol. 67 (1945), page 1982. (Copies in Library.)

UNITED STATES PATENT OFFICE
CERTIFICATE OF CORRECTION

Patent No. 3,052,708                                    September 4, 1962

Leon Velluz et al.

It is hereby certified that error appears in the above numbered patent requiring correction and that the said Letters Patent should read as corrected below.

Column 4, line 46, after "40.2 gm." insert -- (about 0.216 mol) --; column 8, lines 35 to 37, for "wherein X represents chlorine at temperature between about room temperature and 120° C. and R" represents a lower alkyl radical," read -- wherein X represents chlorine and R" represents a lower alkyl radical at temperatures between about room temperature and 120° C., --.

Signed and sealed this 22nd day of January 1963.

(SEAL)
Attest:

ERNEST W. SWIDER                            DAVID L. LADD
Attesting Officer                                    Commissioner of Patents